US010271346B2

(12) United States Patent
Shi et al.

(10) Patent No.: US 10,271,346 B2
(45) Date of Patent: Apr. 23, 2019

(54) METHOD FOR SCHEDULING TERMINAL DEVICE, AND NETWORK DEVICE

(71) Applicant: Huawei Technologies Co., Ltd., Shenzhen, Guangdong (CN)

(72) Inventors: Dai Shi, Shanghai (CN); Wenting Guo, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 15/694,716

(22) Filed: Sep. 1, 2017

(65) Prior Publication Data

US 2017/0367112 A1 Dec. 21, 2017

Related U.S. Application Data

(63) Continuation of application No. PCT/CN2015/073571, filed on Mar. 3, 2015.

(51) Int. Cl.
*H04L 25/02* (2006.01)
*H04W 72/12* (2009.01)
(Continued)

(52) U.S. Cl.
CPC .......... *H04W 72/1278* (2013.01); *H04L 1/00* (2013.01); *H04L 5/0023* (2013.01); *H04L 5/0048* (2013.01); *H04L 5/0082* (2013.01); *H04W 72/044* (2013.01); *H04L 5/006* (2013.01); *H04W 88/02* (2013.01); *H04W 88/08* (2013.01)

(58) Field of Classification Search
CPC . H04W 72/1278; H04W 88/08; H04W 88/02; H04W 72/04; H04L 5/0082; H04L 5/0023; H04L 5/0048; H04L 1/00; H04L 5/00

See application file for complete search history.

(56) References Cited

U.S. PATENT DOCUMENTS 7,542,726 B2 * 6/2009 Ruprich ................ H04L 1/0618
370/204
2004/0228270 A1 * 11/2004 Chen ................... H04L 27/2657
370/210

(Continued)

FOREIGN PATENT DOCUMENTS

CN 101971552 A 2/2011
CN 103457694 A 12/2013

*Primary Examiner* — Jay P Patel

(57) ABSTRACT

A method for scheduling a terminal device comprises performing blind detection on N subframes by using at least one codebook and a pilot corresponding to the codebook, and determining, according to a blind detection result, a first pilot set corresponding to each codebook in each subframe, where correct terminal data cannot be obtained by performing blind detection by using a pilot in the first pilot set and a corresponding codebook. The method comprises determining, according to the first pilot set corresponding to each codebook, a second pilot set corresponding to each codebook, where a pilot in the second pilot set is a pilot that is in the first pilot set and that has already been sent by the terminal device, and determining a to-be-used transmission mode according to the second pilot set corresponding to each codebook in each subframe, where different transmission modes correspond to different spectrum multiplex rates.

19 Claims, 8 Drawing Sheets

(51) Int. Cl.
*H04L 1/00* (2006.01)
*H04L 5/00* (2006.01)
*H04W 72/04* (2009.01)
*H04W 88/02* (2009.01)
*H04W 88/08* (2009.01)

(56) References Cited

U.S. PATENT DOCUMENTS

| | | | |
|---|---|---|---|
| 2005/0260950 A1* | 11/2005 | Ruprich | H04L 1/0618 455/70 |
| 2006/0215732 A1* | 9/2006 | Chen | H04B 1/707 375/141 |
| 2008/0101487 A1* | 5/2008 | Muck | H04L 27/261 375/260 |
| 2009/0196279 A1* | 8/2009 | Kim | H04J 11/0069 370/350 |
| 2009/0225722 A1 | 9/2009 | Cudak et al. | |
| 2012/0219095 A1* | 8/2012 | Pitkanen | H04L 1/0038 375/340 |
| 2013/0279555 A1* | 10/2013 | Jonsson | H04L 25/0226 375/227 |
| 2013/0322333 A1 | 12/2013 | Tsai | |
| 2014/0009002 A1 | 1/2014 | Ichikawa | |
| 2014/0018086 A1* | 1/2014 | Guo | H04L 5/0048 455/450 |
| 2014/0098773 A1 | 4/2014 | Yoo et al. | |
| 2015/0341958 A1* | 11/2015 | Guo | H04W 72/042 370/329 |
| 2016/0105875 A1* | 4/2016 | Liu | H04W 72/042 370/329 |
| 2016/0277218 A1* | 9/2016 | Jongren | H04L 5/0091 |
| 2017/0078067 A1* | 3/2017 | Sun | H04W 16/02 |

* cited by examiner

200

┌─────────────────────────────────────────────────────┐
│ Perform blind detection on each of N subframes by using at least
│ one codebook and a pilot corresponding to each of the at least one
│ codebook                                            │ ⟋ 210
└─────────────────────────────────────────────────────┘
                              ↓
┌─────────────────────────────────────────────────────┐
│ Determine, according to a blind detection result, a first pilot set
│ corresponding to each codebook in each subframe, where correct
│ terminal data cannot be obtained by performing blind detection by │ ⟋ 220
│ using a pilot in the first pilot set and a corresponding codebook │
└─────────────────────────────────────────────────────┘
                              ↓
┌─────────────────────────────────────────────────────┐
│ Determine, according to the first pilot set corresponding to each
│ codebook in each subframe, a second pilot set corresponding to
│ each codebook in each subframe, where a pilot in the second pilot │ ⟋ 230
│ set is a pilot that is in the first pilot set and that has already been
│ sent by the terminal device                         │
└─────────────────────────────────────────────────────┘
                              ↓
┌─────────────────────────────────────────────────────┐
│ Determine a to-be-used transmission mode of the terminal device
│ according to the second pilot set corresponding to each codebook in │ ⟋ 240
│ each subframe, where different transmission modes correspond to
│ different spectrum multiplex rates                  │
└─────────────────────────────────────────────────────┘

FIG. 3

METHOD FOR SCHEDULING TERMINAL DEVICE, AND NETWORK DEVICE

CROSS-REFERENCE TO RELATED APPLICATIONS

This application is a continuation of International Application No. PCT/CN2015/073571, filed on Mar. 3, 2015, the disclosure of which is hereby incorporated by reference in its entirety.

TECHNICAL FIELD

The present disclosure relates to the communications field, and more specifically, to a method for scheduling a terminal device, and a network device.

BACKGROUND

With continuous evolution of wireless cellular networks, orthogonal multiple access technologies, such as a Code Division Multiple Access (Code Division Multiple Access, "CDMA" for short) technology and an Orthogonal Frequency Division Multiple Access (Orthogonal Frequency Multiple Access, "OFDMA" for short) technology, that are widely applied to a 3rd-generation (3rd-Generation, "3G" for short) mobile communications system and a 4th-generation (4th-Generation, "3G" for short) mobile communications system gradually cannot satisfy people's growing requirements on capacities of cellular networks such as massive access and continuous improvement of spectrum efficiency. In addition, research and application of non-orthogonal multiple access technologies gradually attract more attention from the field and the academic circle. It is expected that a capacity improvement problem can be effectively resolved on future wireless cellular networks such as a 5th-generation (5th-Generation, "5G" for short) mobile communications system by means of the non-orthogonal multiple access technologies.

A sparse code multiple access (Sparse Code Multiple Access, "SCMA" for short) technology is a typical non-orthogonal multiple access and transmission technology. Certainly, the SCMA technology may be referred to as other names in the communications field. According to this technology, M (M is an integer not less than 1) data streams of one or more terminals are overlaid to N (N is an integer not less than 1) subcarriers for sending. Each piece of data of each data stream is extended to the N subcarriers by means of sparse spread spectrum. When a value of M is greater than that of N, this type of technology can effectively improve a network capacity, including a quantity of terminals that can access a system and spectrum efficiency. Therefore, as an important non-orthogonal access technology, the SCMA technology has attracted more attention and become an important candidate access technology in evolution of future wireless cellular networks.

Grant free (Grant free) is a special scheduling mechanism for transmission of small data packets in the SCMA technology, so as to reduce overheads and redundancy resulting from frequent scheduling requests. For an uplink channel, a grant-free terminal no longer requests for a resource, but directly performs uplink transmission on a grant-free resource by using a codebook in at least one codebook and a pilot corresponding to the codebook. A base station performs blind detection on the grant-free resource by using the at least one codebook and the pilot corresponding to the codebook.

For the uplink, the grant-free scheduling manner can reduce uplink resource request signaling, thereby reducing data transmission delays and saving bandwidth.

However, there is no existing technology that relates to how to improve a network capacity, that is, a spectrum multiplex rate, in the transmission mechanism.

SUMMARY

Embodiments of the present disclosure provide a method for scheduling a terminal device, and a network device, to resolve a problem of complex decoding of a network device that results from an increase in a spectrum multiplex rate, and a problem of a collision generated because at least two terminal devices select a same codebook and pilot due to a decrease in a spectrum multiplex rate.

According to a first aspect, a method for scheduling a terminal device is provided, including:

performing blind detection on each of N subframes by using at least one codebook and a pilot corresponding to each of the at least one codebook, where N is a positive integer;

determining, according to a blind detection result, a first pilot set corresponding to each codebook in each subframe, where correct terminal data cannot be obtained by performing blind detection by using a pilot in the first pilot set and a corresponding codebook;

determining, according to the first pilot set corresponding to each codebook in each subframe, a second pilot set corresponding to each codebook in each subframe, where a pilot in the second pilot set is a pilot that is in the first pilot set and that has already been sent by the terminal device; and determining a to-be-used transmission mode of the terminal device according to the second pilot set corresponding to each codebook in each subframe, where different transmission modes correspond to different spectrum multiplex rates.

With reference to the first aspect, in a first possible implementation of the first aspect, a product of a quantity of codebooks in the at least one codebook and a quantity of pilots corresponding to the codebooks is less than a quantity of terminal devices that perform access in each subframe.

With reference to the first aspect or the first possible implementations of the first aspect, in a second possible implementation of the first aspect, the determining a to-be-used transmission mode of the terminal device according to the second pilot set corresponding to each codebook in each subframe includes:

determining the to-be-used transmission mode of the terminal device according to at least one of: a total quantity of pilots in second pilot sets corresponding to all codebooks in the N subframes, or a quantity of subframes in which the second pilot set corresponding to each codebook is an empty set.

With reference to the second possible implementation of the first aspect, in a third possible implementation of the first aspect, the determining the to-be-used transmission mode of the terminal device includes:

when the total quantity of the pilots in the second pilot sets corresponding to all the codebooks in the N subframes is greater than or equal to a first threshold, determining the to-be-used transmission mode of the terminal device to be a first transmission mode, where a spectrum multiplex rate corresponding to the first transmission mode is greater than a spectrum multiplex rate corresponding to a current transmission mode of the terminal device; and the method further includes:

sending a first notification message to the terminal device, where the first notification message is used to instruct the terminal device to transmit data in the first transmission mode.

With reference to the second or third possible implementation of the first aspect, in a fourth possible implementation of the first aspect, the determining the to-be-used transmission mode of the terminal device includes:

when the quantity of the subframes in which the second pilot set corresponding to each codebook is an empty set is greater than or equal to a second threshold, determining the to-be-used transmission mode of the terminal device to be a second transmission mode, where a spectrum multiplex rate corresponding to the second transmission mode is less than the spectrum multiplex rate corresponding to the current transmission mode of the terminal device; and the method further includes:

sending a second notification message to the terminal device, where the second notification message is used to instruct the terminal device to transmit data in the second transmission mode.

With reference to any one of the first aspect or the possible implementations of the first aspect, in a fifth possible implementation of the first aspect, the determining a second pilot set corresponding to each codebook in each subframe includes:

determining a signal strength of each pilot in the first pilot set corresponding to each codebook in each subframe; and determining the second pilot set corresponding to each codebook in each subframe according to the signal strength of each pilot in the first pilot set corresponding to each codebook in each subframe, where a signal strength of each pilot in the second pilot set is greater than or equal to a third threshold.

With reference to any one of the first aspect or the possible implementations of the first aspect, in a sixth possible implementation of the first aspect, before the performing blind detection on each of N subframes, the method further includes:

sending a third notification message to the terminal device, where the third notification message is used to indicate a transmission mode used by the terminal device in the N subframes, where the transmission mode used in the N subframes is used to indicate the at least one codebook and the pilot corresponding to each of the at least one codebook.

With reference to any one of the first aspect or the possible implementations of the first aspect, in a seventh possible implementation of the first aspect, the method further includes:

determining, according to the blind detection result, a quantity of times of using a same codebook by multiple terminal devices in the N subframes; and the determining a to-be-used transmission mode of the terminal device according to the second pilot set corresponding to each codebook in each subframe includes:

determining the to-be-used transmission mode of the terminal device according to the quantity of times of using a same codebook by multiple terminal devices in the N subframes, and the second pilot set corresponding to each codebook in each subframe.

With reference to any one of the first aspect or the possible implementations of the first aspect, in an eighth possible implementation of the first aspect, a spectrum multiplex rate corresponding to a transmission mode of the terminal device includes 150% and 300%.

According to a second aspect, a network device is provided, including:

a blind detection unit, configured to perform blind detection on each of N subframes by using at least one codebook and a pilot corresponding to each of the at least one codebook, where N is a positive integer;

a first determining unit, configured to determine, according to a blind detection result that is obtained by the blind detection unit, a first pilot set corresponding to each codebook in each subframe, where correct terminal data cannot be obtained by performing blind detection by using a pilot in the first pilot set and a corresponding codebook;

a second determining unit, configured to determine, according to the first pilot set that corresponds to each codebook in each subframe and that is determined by the first determining unit, a second pilot set corresponding to each codebook in each subframe, where a pilot in the second pilot set is a pilot that is in the first pilot set and that has already been sent by the terminal device; and a third determining unit, configured to determine a to-be-used transmission mode of the terminal device according to the second pilot set that corresponds to each codebook in each subframe and that is determined by the second determining unit, where different transmission modes correspond to different spectrum multiplex rates.

With reference to the second aspect, in a first possible implementation of the second aspect, a product of a quantity of codebooks in the at least one codebook and a quantity of pilots corresponding to the codebooks is less than a quantity of terminal devices that perform access in each subframe.

With reference to the second aspect or the first possible implementation of the second aspect, in a second possible implementation of the second aspect, the third determining unit is specifically configured to:

determine the to-be-used transmission mode of the terminal device according to at least one of: a total quantity of pilots in second pilot sets corresponding to all codebooks in the N subframes, or a quantity of subframes when the second pilot set corresponding to each codebook is an empty set.

With reference to the second possible implementation of the second aspect, in a third possible implementation of the second aspect, the third determining unit is specifically configured to:

when the total quantity of the pilots in the second pilot sets corresponding to all the codebooks in the N subframes is greater than or equal to a first threshold, determine the to-be-used transmission mode of the terminal device to be a first transmission mode, where a spectrum multiplex rate corresponding to the first transmission mode is greater than a spectrum multiplex rate corresponding to a current transmission mode of the terminal device; and the network device further includes:

a first notification unit, configured to send a first notification message to the terminal device, where the first notification message is used to instruct the terminal device to transmit data in the first transmission mode.

With reference to the second or third possible implementation of the second aspect, in a fourth possible implementation of the second aspect, the third determining unit is specifically configured to:

when the quantity of the subframes in which the second pilot set corresponding to each codebook is an empty set is greater than or equal to a second threshold, determine the to-be-used transmission mode of the terminal device to be a second transmission mode, where a spectrum multiplex rate corresponding to the second transmission mode is less than the spectrum multiplex rate corresponding to the current transmission mode of the terminal device; and the network device further includes:

a second notification unit, configured to send a second notification message to the terminal device, where the second notification message is used to instruct the terminal device to transmit data in the second transmission mode.

With reference to any one of the second aspect or the possible implementations of the second aspect, in a fifth possible implementation of the second aspect, the second determining unit is specifically configured to:

determine a signal strength of each pilot in the first pilot set corresponding to each codebook in each subframe; and determine the second pilot set corresponding to each codebook in each subframe according to the signal strength of each pilot in the first pilot set corresponding to each codebook in each subframe, where a signal strength of each pilot in the second pilot set is greater than or equal to a third threshold.

With reference to any one of the second aspect or the possible implementations of the second aspect, in a sixth possible implementation of the second aspect, the network device further includes a third notification unit, configured to: before the blind detection unit performs the blind detection on each of the N subframes, send a third notification message to the terminal device, where the third notification message is used to indicate a transmission mode used by the terminal device in the N subframes, where the transmission mode used in the N subframes is used to indicate the at least one codebook and the pilot corresponding to each of the at least one codebook.

With reference to any one of the second aspect or the possible implementations of the second aspect, in a seventh possible implementation of the second aspect, the network device further includes:

a fourth determining unit, configured to determine, according to the blind detection result, a quantity of times of using a same codebook by multiple terminal devices in the N subframes, where the third determining unit is specifically configured to:

determine the to-be-used transmission mode of the terminal device according to the quantity of times of using a same codebook by multiple terminal devices in the N subframes, and the second pilot set corresponding to each codebook in each subframe.

With reference to any one of the second aspect or the possible implementations of the second aspect, in an eighth possible implementation of the second aspect, a spectrum multiplex rate corresponding to a transmission mode of the terminal device includes 150% and 300%.

With reference to any one of the second aspect or the possible implementations of the second aspect, in a ninth possible implementation of the second aspect, the network device is a base station.

According to a third aspect, a network device is provided, including: a processor, a memory, a bus system, and a transceiver, where the processor, the memory, and the transceiver are connected by using the bus system, the memory is configured to store an instruction, the transceiver is configured to receive data sent by a terminal device, and the processor invokes the instruction in the memory to perform the following operations:

performing blind detection on each of N subframes according to at least one codebook and a pilot corresponding to each of the at least one codebook and by using the data received by the transceiver, where N is a positive integer;

determining, according to a blind detection result, a first pilot set corresponding to each codebook in each subframe, where correct terminal data cannot be obtained by performing blind detection by using a pilot in the first pilot set and a corresponding codebook;

determining, according to the first pilot set corresponding to each codebook in each subframe, a second pilot set corresponding to each codebook in each subframe, where a pilot in the second pilot set is a pilot that is in the first pilot set and that has already been sent by the terminal device; and determining a to-be-used transmission mode of the terminal device according to the second pilot set corresponding to each codebook in each subframe, where different transmission modes correspond to different spectrum multiplex rates.

With reference to the third aspect, in a first possible implementation of the third aspect, a product of a quantity of codebooks in the at least one codebook and a quantity of pilots corresponding to the codebooks is less than a quantity of terminal devices that perform access in each subframe.

With reference to the third aspect or the first possible implementation of the third aspect, in a second possible implementation of the third aspect, in the process in which the processor invokes the instruction in the memory to determine the to-be-used transmission mode of the terminal device according to the second pilot set corresponding to each codebook in each subframe, the processor specifically performs the following operation:

determining the to-be-used transmission mode of the terminal device according to at least one of: a total quantity of pilots in second pilot sets corresponding to all codebooks in the N subframes, or a quantity of subframes in which the second pilot set corresponding to each codebook is an empty set.

With reference to the second possible implementation of the third aspect, in a third possible implementation of the third aspect, in the process in which the processor invokes the instruction in the memory to determine the to-be-used transmission mode of the terminal device, the processor specifically performs the following operation:

when the total quantity of the pilots in the second pilot sets corresponding to all the codebooks in the N subframes is greater than or equal to a first threshold, determining the to-be-used transmission mode of the terminal device to be a first transmission mode, where a spectrum multiplex rate corresponding to the first transmission mode is greater than a spectrum multiplex rate corresponding to a current transmission mode of the terminal device; and the processor invokes the instruction in the memory to further perform the following operation:

sending a first notification message to the terminal device by using the transceiver, where the first notification message is used to instruct the terminal device to transmit data in the first transmission mode.

With reference to the second or third possible implementation of the third aspect, in a fourth possible implementation of the third aspect, in the process in which the processor invokes the instruction in the memory to determine the to-be-used transmission mode of the terminal device, the processor specifically performs the following operation:

when the quantity of the subframes in which the second pilot set corresponding to each codebook is an empty set is greater than or equal to a second threshold, determining the to-be-used transmission mode of the terminal device to be a second transmission mode, where a spectrum multiplex rate corresponding to the second transmission mode is less than the spectrum multiplex rate corresponding to the current transmission mode of the terminal device; and the processor invokes the instruction in the memory to further perform the following operation:

sending a second notification message to the terminal device by using the transceiver, where the second notification message is used to instruct the terminal device to transmit data in the second transmission mode.

With reference to any one of the third aspect or the possible implementations of the third aspect, in a fifth possible implementation of the third aspect, in the process in which the processor invokes the instruction in the memory to determine the second pilot set corresponding to each codebook in each subframe, the processor specifically performs the following operations:

determining a signal strength of each pilot in the first pilot set corresponding to each codebook in each subframe; and determining the second pilot set corresponding to each codebook in each subframe according to the signal strength of each pilot in the first pilot set corresponding to each codebook in each subframe, where a signal strength of each pilot in the second pilot set is greater than or equal to a third threshold.

With reference to any one of the third aspect or the possible implementations of the third aspect, in a sixth possible implementation of the third aspect, before performing blind detection on each of N subframes, the processor invokes the instruction in the memory to further perform the following operation:

sending a third notification message to the terminal device, where the third notification message is used to indicate a transmission mode used by the terminal device in the N subframes, where the transmission mode used in the N subframes is used to indicate the at least one codebook and the pilot corresponding to each of the at least one codebook.

With reference to any one of the third aspect or the possible implementations of the third aspect, in a seventh possible implementation of the third aspect, the processor invokes the instruction in the memory to further perform the following operation:

determining, according to the blind detection result, a quantity of times of using a same codebook by multiple terminal devices in the N subframes; and in the process in which the processor invokes the instruction in the memory to determine the to-be-used transmission mode of the terminal device according to the second pilot set corresponding to each codebook in each subframe, the processor specifically performs the following operation:

determining the to-be-used transmission mode of the terminal device according to the quantity of times of using a same codebook by multiple terminal devices in the N subframes, and the second pilot set corresponding to each codebook in each subframe.

With reference to any one of the third aspect or the possible implementations of the third aspect, in an eighth possible implementation of the third aspect, a spectrum multiplex rate corresponding to a transmission mode of the terminal device includes 150% and 300%.

With reference to any one of the third aspect or the possible implementations of the third aspect, in a ninth possible implementation of the third aspect, the network device is a base station.

Therefore, in the embodiments of the present disclosure, a second pilot set corresponding to each codebook in each of N subframes is determined, where the second pilot set is a pilot set that is of pilots selected by at least two terminal devices and that corresponds to each codebook in each subframe, and a to-be-used transmission mode of a terminal device is determined according to the second pilot set, where different transmission modes correspond to different spectrum multiplex rates. In other words, a spectrum multiplex rate may be flexibly selected according to the pilot set that is of the pilots selected by the at least two terminal devices and that corresponds to each codebook in each of the N subframes, so as to resolve a problem of complex decoding of a network device that results from an increase in a spectrum multiplex rate, and a problem of a collision generated because at least two terminal devices select a same codebook and pilot due to a decrease in a spectrum multiplex rate.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

FIG. 3 is a schematic flowchart of a method 200 for scheduling a terminal device according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a terminal device may communicate with one or more core networks by using a radio access network (Radio Access Network, "RAN" for short). The terminal device may be referred to as an access terminal, user equipment (User Equipment, "UE" for short), a subscriber unit, a subscriber station, a mobile station, a mobile station, a remote station, a remote terminal, a mobile device, a user terminal, a terminal, a radio communications device, a user agent, or a user apparatus. The access terminal may be a cellular phone, a cordless phone, a Session Initiation Protocol (Session Initiation Protocol, "SIP" for short) phone, a wireless local loop (Wireless Local Loop, "WLL" for short) station, a personal digital assistant (Personal Digital Assistant, PDA for short), a handheld device having a wireless communication function, a computing device, another processing device connected to a wireless modem, an in-vehicle device, a wearable device, and a terminal device in a future 5G network.

In the embodiments of the present disclosure, the network device may be configured to communicate with a terminal device. The network device may be a base transceiver station (Base Transceiver Station, "BTS" for short) in a Global System for Mobile Communications (Global System of Mobile communication, "GSM" for short) system or Code Division Multiple Access (Code Division Multiple Access, "CDMA" for short), or may be a NodeB (NodeB, "NB" for short) in a Wideband Code Division Multiple Access (Wideband Code Division Multiple Access, "WCDMA" for short) system, or may be an evolved NodeB (Evolutional Node B, "eNB" or "eNodeB" for short) in a Long Term Evolution (Long Term Evolution, "LTE" for short) system. Alternatively, the network device may be a relay node, an access point, an in-vehicle device, a wearable device, or a base station device in a future 5G network.

Figure 1:
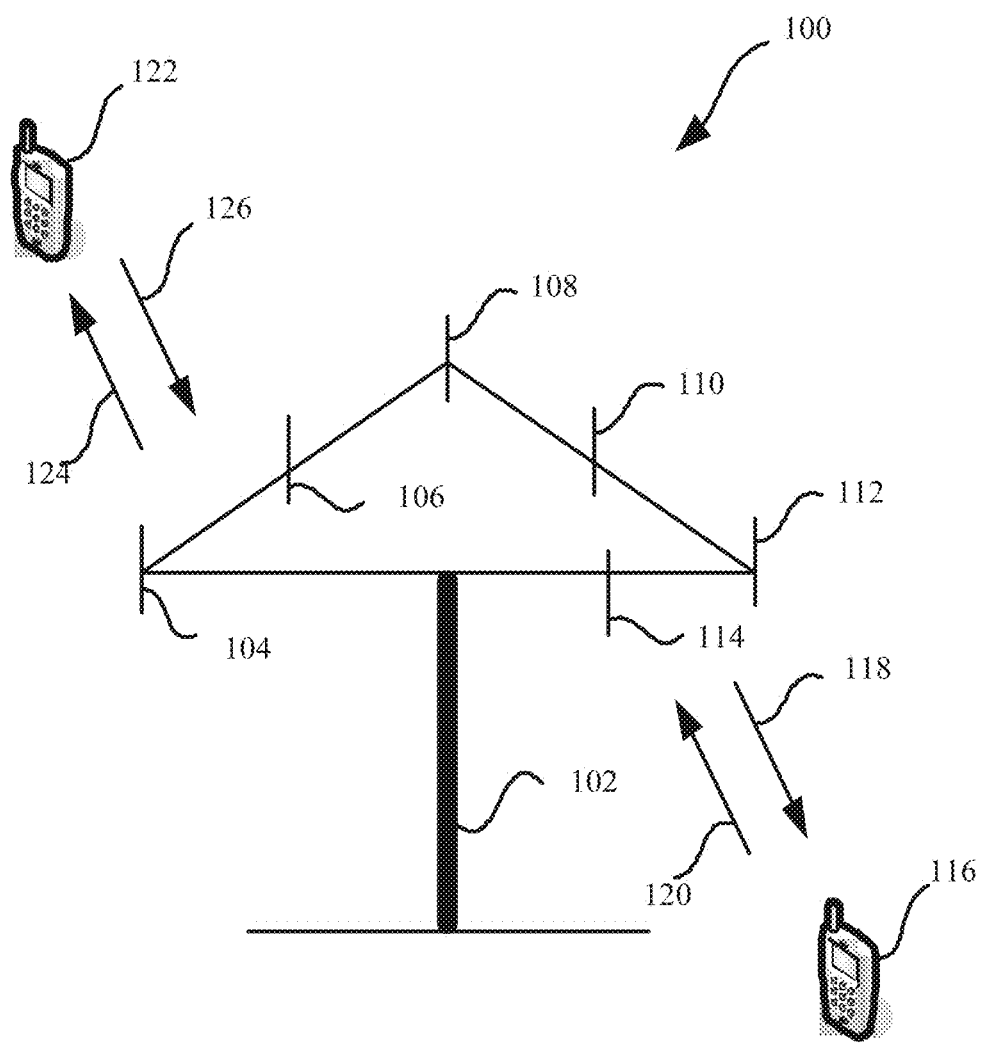
FIG. 1 is a diagram 100 of an application scenario according to an embodiment of the present disclosure.

FIG. 1 is a schematic diagram of a communications system that uses a method for scheduling a terminal device of the present disclosure. As shown in FIG. 1, the communications system 100 includes a network device 102, and the network device 102 may include multiple antenna groups. Each antenna group may include one or more antennas. For example, one antenna group may include antennas 104 and 106, another antenna group may include antennas 108 and 110, and an additional group may include antennas 112 and 114. In FIG. 1, for each antenna group, two antennas are shown; however, more or less antennas may be used for each group. The network device 102 may additionally include a transmitter chain and a receiver chain, and a person of ordinary skill in the art may understand that both of them may include multiple components (for example, a processor, a modulator, a multiplexer, a demodulator, a demultiplexer, and an antenna) related to signal sending and receiving.

The network device 102 may communicate with multiple terminal devices (such as a terminal device 116 and a terminal device 122). However, it may be understood that the network device 102 may communicate with any quantity of terminal devices similar to the terminal device 116 or the terminal device 122. The terminal devices 116 and 122 may be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114, where the antennas 112 and 114 send information to the terminal device 116 through a forward link 118, and receive information from the terminal device 116 through a reverse link 120. In addition, the terminal device 122 communicates with the antennas 104 and 106, where the antennas 104 and 106 send information to the terminal device 122 through a forward link 124, and receive information from the terminal device 122 through a reverse link 126.

For example, in a frequency division duplex (FDD, Frequency Division Duplex) system, for example, a frequency band different from that used for the reverse link 120 may be used for the forward link 118, and a frequency band different from that used for the reverse link 126 may be used for the forward link 124.

For another example, in a time division duplex (TDD, Time Division Duplex) system and a full duplex (Full Duplex) system, a same frequency band may be used for the forward link 118 and the reverse link 120, and a same frequency band may be used for the forward link 124 and the reverse link 126.

Each antenna group and/or area designed for communication is referred to as a sector of the network device 102. For example, an antenna group may be designed to communicate with a terminal device in a sector of an area covered by the network device 102. In a process of respectively communicating, by the network device 102, with the terminal devices 116 and 122 by using the forward links 118 and 124, a transmit antenna of the network device 102 may improve signal-to-noise ratios of the forward links 118 and 124 by means of beamforming. In addition, compared with sending, by the network device by using a single antenna, signals to all terminal devices of the network device, sending, by the network device 102 by means of beamforming, signals to the terminal devices 116 and 122 that are dispersed randomly in a related coverage area causes less interference to a mobile device in a neighboring cell.

In a given time, the network device 102, the terminal device 116, or the terminal device 122 may be a wireless communications sending apparatus and/or a wireless communications receiving apparatus. When sending data, the wireless communications sending apparatus may encode data for transmission. Specifically, the wireless communications sending apparatus may obtain (for example, generate, receive from another communications apparatus, or store in a memory) a particular quantity of data bits to be sent to the wireless communications receiving apparatus through a channel. The data bits may be included in a transmission block (or multiple transmission blocks) of the data.

Optionally, in the communications system 100 that uses the method and apparatus for scheduling a terminal device in the embodiments of the present disclosure, within a same period, multiple terminal devices multiplex a same time-frequency resource and perform data transmission with the network device. Moreover, as the same time-frequency resource, in an example of a time-frequency resource division manner on a per-resource-unit (RE, Resource Element) basis, the time-frequency resource may be a time-frequency resource block (or referred to as a time-frequency resource group) that includes multiple REs.

Optionally, the communications system is sparse code multiple access communications system, and the time-frequency resource is a time-frequency resource block that includes at least two resource units REs.

Specifically, sparse code multiple access (SCMA, Sparse Code Multiple Access) is a new multiple access mode. Certainly, the technology may not be referred to as the SCMA, and may be referred to as other technical names by a person skilled in the art. In this access mode, multiple terminals multiplex a same time-frequency resource block to transmit data. Each resource block includes several resource units REs. The RE herein may be a subcarrier-symbol unit in the OFDM technology, or may be a resource unit of a time domain or a frequency domain in other air interface technologies. For example, in an SCMA system including K terminal devices, available resources are divided into several orthogonal time-frequency resource blocks, and each resource block includes L REs. The L REs may have a same location in a time domain. When sending data, a terminal device #k first divides to-be-sent data into data blocks of S bits, and maps each data block to a group of modulation symbols X#k={X#k$_1$, X#k$_2$, . . . , and X#k$_L$} by searching for a codebook (which is determined and delivered by the network device to the terminal device) of the terminal device #k, where each modulation symbol corresponds to an RE in a resource block, and then a signal waveform is generated according to the modulation symbol. For the data blocks of S bits, each codebook includes 2S different modulation symbol groups corresponding to 2S possible data blocks.

In addition, in the SCMA, in the group of modulation symbols X#k={X#k$_1$, X#k$_2$, . . . , and X#k$_L$} corresponding to each terminal device, at least one symbol is a zero symbol and at least one symbol is a non-zero symbol. That is, for data of a terminal device, in the L REs, only some REs (at least one RE) carry the data of the terminal device.

A codeword may be represented as a multi-dimensional complex vector that has two or more dimensions and that is used to represent mapping relationships between data and two or more modulation symbols. A modulation symbol includes at least one zero modulation symbol and at least one non-zero modulation symbol. A relationship between the zero modulation symbol and the non-zero modulation symbol may be that a quantity of zero modulation symbols is not less than a quantity of non-zero modulation symbols. Data may be binary bit data or multivariate data. The codebook includes two or more codewords. The codebook may represent a mapping relationship between possible data combinations of data of a particular length and codewords in a codebook. The SCMA technology directly maps, according to a particular mapping relationship, data in a data stream to codewords in a codebook, that is, a multi-dimensional complex vector, and sends the data on multiple resource units by means of extension. The data herein may be binary bit data or multivariate data. The multiple resource units may be a resource unit of a time domain, a frequency domain, a space domain, a time-frequency domain, a time-space domain, and a time-frequency-space domain.

Figure 2:
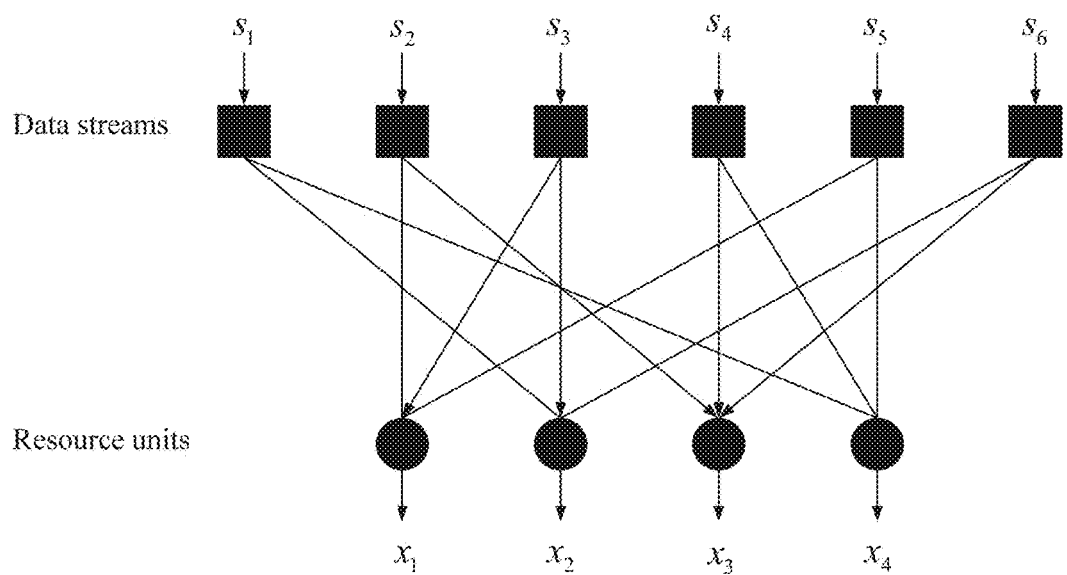
FIG. 2 is a diagram of an encoding principle of SCMA according to an embodiment of the present disclosure.

An encoding principle of the SCMA may be explained by using a bipartite graph shown in FIG. 2:

The bipartite graph shows an example of multiplexing four resource units by six data streams. A data stream may be referred to as a variable node, and a resource unit may be referred to as a function node. Six data streams form a group, and four resource units form a code unit. A resource unit may be a resource unit, a resource element (English: Resource Element, RE for short in English), or an antenna port. In the bipartite graph, a line connecting a data stream and a resource unit represents that after at least one data combination of the data stream is mapped to a codeword, a non-zero modulation symbol is sent on the resource unit. No line connecting a data stream and a resource unit represents that after all possible data combinations of the data stream are mapped to codewords, only zero modulation symbols are sent on the resource unit. The data combination of the data stream may be understood according to the following explanation. For example, in a binary bit data stream, 00, 01, 10, and 11 are all possible two-bit data combinations. For ease of description, s1 to s6 successively represent to-be-sent data combinations of the six data streams in the bipartite graph, and x1 to x4 successively represent symbols to be sent on the four resource units in the bipartite graph. It may be seen from the bipartite graph that after data of each data stream is mapped to a codeword, a modulation symbol is sent on two or more resource units; a symbol sent on each resource unit is obtained by overlaying modulation symbols obtained after data of the two or more data streams is mapped to a respective codeword. For example, after a to-be-sent data combination s3 of a data stream 3 is mapped to a codeword, a non-zero modulation symbol may be sent on a resource unit 1 and a resource unit 2. Data x3 sent on a resource unit 3 is obtained by overlaying non-zero modulation symbols obtained after to-be-sent data combinations s2, s4, and s6 of a data stream 2, a data stream 4, and a data stream 6 are mapped to respective codewords. Because a quantity of data streams may be greater than a quantity of resource units, the SCMA system may effectively improve a network capacity including a quantity of users that can access a system and spectrum efficiency.

With reference to the foregoing descriptions of the codebook and the bipartite graph, a codeword in a codebook usually has the following form:

$$\begin{pmatrix} c_{1,q} \\ c_{2,q} \\ \vdots \\ c_{N,q} \end{pmatrix},$$

and the corresponding codebook usually has the following form:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \ldots, \begin{pmatrix} c_{1,Q_m} \\ c_{2,Q_m} \\ \vdots \\ c_{N,Q_m} \end{pmatrix} \right\}.$$

N is a positive integer greater than 1, or may be represented as a quantity of resource units included in a code unit, or may be understood as a length of the codeword. Qm is a positive integer greater than 1, represents a quantity of codewords included in the codebook, and corresponds to a modulation order. For example, in quadrature phase shift keying (Quadrature Phase Shift Keying, "QPSK" for short) or fourth-order modulation, Qm is 4. Qm is a positive integer, and $1 \leq q \leq Qm$. An element $C_{n,q}$ included in a codeword and a codebook is a complex number, and may be represented as $C_{n,q} = \alpha * \exp(j * \beta)$, $1 \leq n \leq N, 1 \leq q \leq Q_m$ in mathematics, and α and β may be any real numbers. A codeword in a codebook and a data combination in a data stream may form a mapping relationship. For example, a codeword in a codebook may form the following mapping relationship with two-bit data combinations of a binary data stream:"00" may be mapped to a codeword 1

$$\begin{pmatrix} c_{1,1} \\ c_{2,1} \\ \vdots \\ c_{N,1} \end{pmatrix},$$

"01" may be mapped to a codeword 2

$$\begin{pmatrix} c_{1,2} \\ c_{2,2} \\ \vdots \\ c_{N,2} \end{pmatrix},$$

"10" may be mapped to a codeword 3

$$\begin{pmatrix} c_{1,3} \\ c_{2,3} \\ \vdots \\ c_{N,3} \end{pmatrix},$$

and "11" may be mapped to a codeword 4

$$\begin{pmatrix} c_{1,4} \\ c_{2,4} \\ \vdots \\ c_{N,4} \end{pmatrix}.$$

With reference to the foregoing bipartite graph, when there is a line connecting a data stream and a resource unit, a codebook corresponding to the data stream and a codeword in the codebook should have the following characteristics: for at least one codeword in the codebook, a non-zero modulation symbol is sent on the corresponding resource unit. For example, there is a line connecting the data stream 3 and the resource unit 1. In this case, at least one codeword of a codebook corresponding to the data stream 3 satisfies $C_{1,q} \neq 0$, where $1 \leq q \leq Qm$. When there is no line connecting a data stream and a resource unit, a codebook corresponding to the data stream and a codeword in the codebook should have the following characteristics: for all codewords in the codebook, zero modulation symbols are sent on the corresponding resource unit. For example, there is no line connecting the data stream 3 and the resource unit 3, and in this case, any codeword in a codebook corresponding to the data stream 3 satisfies $C_{3,q}=0$, where $1 \leq q \leq Qm$. In conclusion, when a modulation order is QPSK, the codebook corresponding to the data stream 3 in the bipartite graph may have the following form and characteristics:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

where $C_{n,q}=\alpha^* \exp(j^*\beta)$, $1 \leq n \leq 2$, $1 \leq q \leq 4$, $\alpha$ and $\beta$ may be any real numbers, for any q, $1 \leq q \leq 4$, $C_{1,q}$ and $C_{2,q}$ are not zero at the same time, and there is at least one group of q1 and q2, where $1 \leq q1$ and $q2 \leq 4$, so that $C_{1,q_1} \neq 0$ and $C_{2,q_2} \neq 0$. For example, if the data combination s3 of the data stream 3 is "10", according to the foregoing mapping rule, the data combination is mapped to a codeword $$\begin{pmatrix} c_{1,3} \\ c_{2,3} \\ 0 \\ 0 \end{pmatrix},$$

that is, a four-dimensional complex vector.

It should be understood that the SCMA system listed above is only an example of a communications system applicable to the method and apparatus for scheduling a terminal device in the present disclosure, but the present disclosure is not limited thereto. Other communications system by using which terminal devices can transmit data by multiplexing a same time-frequency resource in a same period shall fall within the protection scope of the present disclosure.

FIG. 3 is a schematic flowchart of a method 200 for scheduling a terminal device according to an embodiment of the present disclosure. As shown in FIG. 3, the method 200 includes the following steps:

210: Perform blind detection on each of N subframes by using at least one codebook and a pilot corresponding to each of the at least one codebook, where N is a positive integer.

220: Determine, according to a blind detection result, a first pilot set corresponding to each codebook in each subframe, where correct terminal data cannot be obtained by performing blind detection by using a pilot in the first pilot set and a corresponding codebook.

230: Determine, according to the first pilot set corresponding to each codebook in each subframe, a second pilot set corresponding to each codebook in each subframe, where a pilot in the second pilot set is a pilot that is in the first pilot set and that has already been sent by the terminal device.

240: Determine a to-be-used transmission mode of the terminal device according to the second pilot set corresponding to each codebook in each subframe, where different transmission modes correspond to different spectrum multiplex rates.

Specifically, when performing uplink transmission, in each subframe, the terminal device does not request a resource from a network device, but directly performs uplink transmission on a grant-free resource by using a codebook of the at least one codebook and a pilot corresponding to the codebook. In each subframe, the network device performs blind detection on the grant-free resource by using the at least one codebook and the pilot corresponding to each of the at least one codebook. Because each terminal device cannot learn a codebook and a pilot selected by another terminal device, different terminal devices may select a same codebook and a same pilot. In this way, the network device cannot detect data sent by the different terminal devices. Alternatively, if a codebook and a pilot corresponding to the codebook are not selected by the terminal device, the network device cannot obtain terminal data by decoding by using the codebook and the pilot . For the two cases above, the network device cannot obtain correct terminal data. In this case, the network device may determine a first pilot set corresponding to each codebook, where correct terminal data cannot be obtained by performing blind detection by using a pilot in the first pilot set and a corresponding codebook. The network device may determine, in the first pilot set corresponding to each codebook in each subframe, a pilot set, that is, a second pilot set, that corresponds to each codebook in each subframe and that is of pilots already sent by the terminal device. The second pilot set may be understood as a pilot set in which each pilot is selected by at least two terminal devices at the same time. The to-be-used transmission mode of the terminal device is determined according to the second pilot set. Different transmission modes correspond to different spectrum multiplex rates.

Therefore, in this embodiment of the present disclosure, a second pilot set corresponding to each codebook in each of N subframes is determined, where the second pilot set is a pilot set that is of pilots selected by at least two terminal devices and that corresponds to each codebook in each subframe, and a to-be-used transmission mode of a terminal device is determined according to the second pilot set, where different transmission modes correspond to different spectrum multiplex rates. In other words, a spectrum multiplex rate may be flexibly selected according to the pilot set that is of the pilots selected by the at least two terminal devices and that corresponds to each codebook in each of the N subframes, so as to resolve a problem of complex decoding of a network device that results from an increase in a spectrum multiplex rate, and a problem of a collision generated because at least two terminal devices select a same codebook and pilot due to a decrease in a spectrum multiplex rate.

In this embodiment of the present invention, the at least one codebook includes codebooks that are used when multiple terminal devices perform uplink transmission on a multiplexed time-frequency resource. Each codebook may correspond to at least one pilot, and each codebook may correspond to different pilots. A pilot may be a demodulation reference signal (De Modulation Reference Signal, DMRS).

In general cases, it is impossible that the terminal device sends services at all times, and an arriving frequency of a service packet is far less than a transmission frequency of an air-interface frame. Therefore, from a perspective of increasing a quantity of terminal devices that perform access, a same (codebook*pilot) may be allocated to multiple terminal devices. In this case, a product of a quantity of codebooks that can be selected by the terminal device and a quantity of pilots corresponding to all codebooks is less than the quantity of the terminal devices that perform access.

Optionally, in this embodiment of the present disclosure, if a quantity of codebooks and/or a quantity of pilots are/is the same, a system capacity maybe increased by increasing a quantity of terminal devices; or if a quantity of terminal devices is the same, interference on a same time-frequency resource block is reduced by reducing a quantity of codebooks and/or pilots, so that a decoding rate may be improved to some extent. If there are a few terminal devices, better channel environment is provided, thereby improving spectrum utilization.

In this embodiment of the present disclosure, a spectrum multiplex rate corresponding to a transmission mode of the terminal device may refer to a relationship between a quantity of resource units (Resource Element, RE) and a quantity of terminal devices that multiplex the quantity of REs. The spectrum multiplex rate may be determined by using the quantity of codebooks and/or the quantity of pilots.

Figure 4:
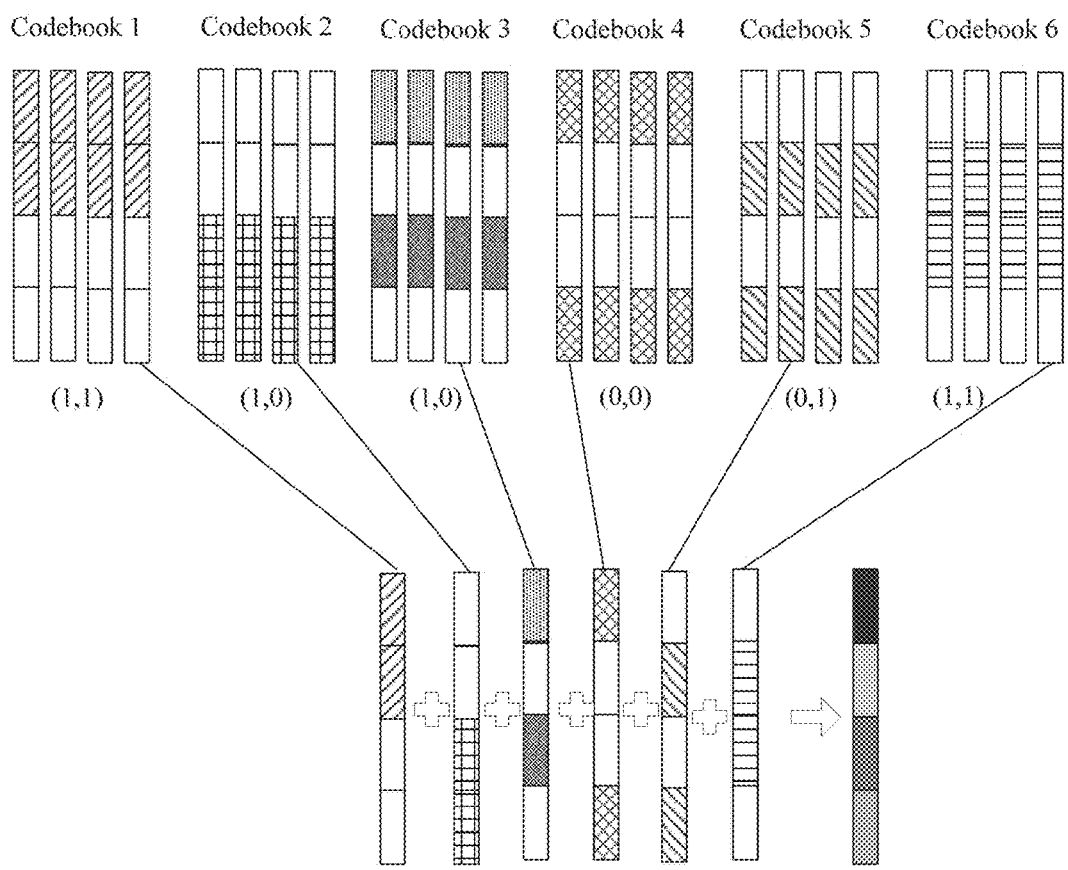
FIG. 4 is a schematic diagram of an example of a spectrum multiplex rate according to an embodiment of the present disclosure.

For example, if six terminal devices multiplex four RE resources together, a spectrum multiplex rate is 150%; if 12 terminal devices multiplex four RE resources together, a spectrum multiplex rate is 300%. For example, as shown in FIG. 3, a total of six terminal devices use six codebooks (which are a codebook 1, a codebook 2, a codebook 3, a codebook 4, a codebook 5, and a codebook 6 in a sequence from left to right in FIG. 4). In the figure, (1 0), (0 1), (1 1), and (0 0) represent data that needs to be encoded. Arrows represent that for different data, different code blocks in a codebook are selected. For example, for data (1 1), a terminal device 1 may perform encoding by using the fourth code block in the codebook 1, and a terminal device 6 performs encoding by using the fourth code block in the codebook 6. It should be understood that six terminal devices multiplexing four REs together means that a maximum of six terminal devices may multiplex four REs at a moment, but does not mean that four REs need to be multiplexed by six terminal devices, and there may be more than six terminal devices that perform access currently.

Optionally, in step 230, the determining a second pilot set corresponding to each codebook in each subframe includes:

determining a signal strength of each pilot in the first pilot set corresponding to each codebook in each subframe; and determining the second pilot set corresponding to each codebook in each subframe according to the signal strength of each pilot in the first pilot set corresponding to each codebook in each subframe, where a signal strength of each pilot in the second pilot set is greater than or equal to a third threshold.

Specifically, if the network device cannot obtain correct terminal data by using a codebook and a pilot corresponding to the codebook, there may be no terminal that performs uplink transmission by using the codebook and the pilot, or there may be different terminal devices that all use the codebook and the pilot. This may be determined by detecting a signal strength of the pilot. If the signal strength of the pilot is greater than a threshold, it may be considered that different terminal devices use the pilot, and consequently, correct decoding cannot be performed. The threshold may be simply set to 0.

In this embodiment of the present disclosure, in step 240, the determining a to-be-used transmission mode of the terminal device according to the second pilot set corresponding to each codebook in each subframe includes:

determining the to-be-used transmission mode of the terminal device according to at least one of: a total quantity of pilots in second pilot sets corresponding to all codebooks in the N subframes, or a quantity of subframes in which the second pilot set corresponding to each codebook is an empty set.

Specifically, when the total quantity of the pilots in the second pilot sets corresponding to all the codebooks in the N subframes is greater than or equal to a first threshold, the network device may determine the to-be-used transmission mode of the terminal device to be a first transmission mode, where a spectrum multiplex rate corresponding to the first transmission mode is greater than a spectrum multiplex rate corresponding to a current transmission mode of the terminal device. In other words, the total quantity of the pilots in the second pilot sets corresponding to all the codebooks in the N subframes may be considered as a total quantity of times different terminal devices select a same (codebook*pilot) combination in the N subframes, that is, a total quantity of times terminal devices collide with each other. If the total quantity is greater than a threshold, it is considered that a current network has excessively high load (which means that terminal devices that perform access cannot perform normal communication because the quantity of codebooks and/or pilots cannot satisfy requirements of the terminal devices, and consequently, the terminal devices collide with each other), and a transmission mode of the terminal device may be changed. For example, a transmission mode in which a spectrum multiplex rate is 150% is changed to a transmission mode in which a spectrum multiplex rate is 300%.

Alternatively, when the quantity of the subframes in which the second pilot set corresponding to each codebook is an empty set is greater than or equal to a second threshold, the network device may determine the to-be-used transmission mode of the terminal device to be a second transmission mode, where a spectrum multiplex rate corresponding to the second transmission mode is less than the spectrum multiplex rate corresponding to the current transmission mode of the terminal device. In other words, the quantity of the subframes in which the second pilot set corresponding to each codebook is an empty set may be considered as a quantity of subframes in which there is no case in which two different terminal devices select a same (codebook*pilot). If the quantity of the subframes is greater than or equal to a threshold, a transmission mode of the terminal device may be changed. For example, a transmission mode in which a spectrum multiplex rate is 300% is changed to a transmission mode in which a spectrum multiplex rate is 150%.

It should be noted that how to determine the to-be-used transmission mode of the terminal device is not limited to the foregoing descriptions. For example, when the total quantity of the pilots in the second pilot sets corresponding to all the codebooks in the N subframes is less than or equal to a threshold, and the quantity of the subframes in which the second pilot set corresponding to each codebook is an empty set is greater than or equal to a threshold, the to-be-used transmission mode of the terminal device is downgraded. Alternatively, when the total quantity of the pilots in the second pilot sets corresponding to all the codebooks in the N subframes is greater than or equal to a threshold, and the quantity of the subframes in which the second pilot set corresponding to each codebook is an empty set is less than or equal to a threshold, the to-be-used transmission mode of the terminal device is upgraded. For another example, the to-be-used transmission mode is determined according to a quantity of subframes. In the subframes, a quantity of second pilot sets that are empty sets is greater than or equal to a threshold. The threshold may be less than the total quantity of codebooks.

In this embodiment of the present disclosure, when the to-be-used transmission mode of the terminal device determined by the network device is different from the current transmission mode, the network device may send a notification message to the terminal device by using a broadcast channel or a control channel, to instruct the terminal device to perform uplink transmission by using the changed transmission mode. The transmission mode may indicate, to the terminal device, to-be-used at least one codebook and a pilot corresponding to each codebook.

Optionally, in this embodiment of the present disclosure, in step 210, before the performing blind detection on each of N subframes, the method further includes:

sending a notification message to the terminal device, where the notification message is used to indicate a transmission mode used by the terminal device in the N subframes, where the transmission mode used in the N subframes is used to indicate the at least one codebook and the pilot corresponding to each of the at least one codebook.

Optionally, in this embodiment of the present disclosure, the network device may further determine, according to the blind detection result, a quantity of times of using a same codebook by multiple terminal devices in the N subframes; and the network device may determine the to-be-used transmission mode of the terminal device according to the quantity of times of using a same codebook by multiple terminal devices in the N subframes, and the second pilot set corresponding to each codebook in each subframe.

To understand the present disclosure more clearly, the present disclosure is described in detail with reference to FIG. 5 and FIG. 6.

Figure 5:
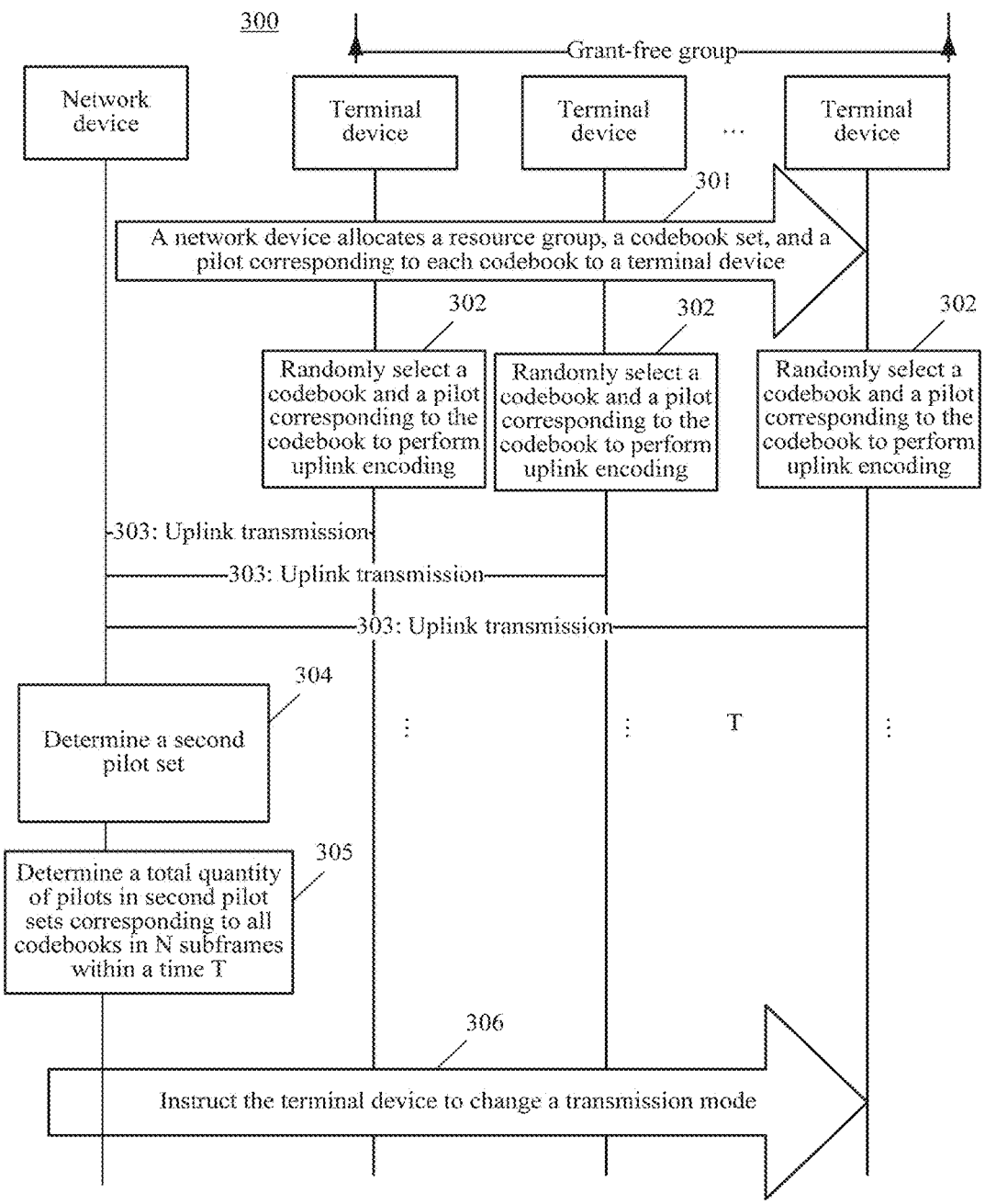
FIG. 5 is a schematic flowchart of a method 300 for scheduling a terminal device according to an embodiment of the present disclosure.

FIG. 5 is a schematic flowchart of a method 300 for scheduling a terminal device according to an embodiment of the present disclosure. As shown in FIG. 5, the method 300 includes the following steps:

301: A network device allocates a grant-free resource group, at least one codebook, and a pilot corresponding to each of the at least one codebook to a grant-free area, where the at least one codebook and the pilot corresponding to each of the at least one codebook are used to perform uplink transmission on the grant-free resource group, and sends the grant-free resource group, the at least one codebook, and the pilot corresponding to each of the at least one codebook to multiple UEs by using a broadcast channel or a control channel. A product of a quantity of codebooks that can be selected by a terminal device and a quantity of pilots corresponding to all codebooks may be less than a maximum quantity of terminal devices that perform access in each subframe.

302: After a terminal device in the grant-free area receives a notification message that is sent by the network device by using the broadcast channel or the control channel, if the terminal device needs to perform uplink transmission in a subframe, the terminal device may randomly select a codebook from the at least one codebook, randomly select a pilot from pilots corresponding to the randomly-selected codebook, and perform uplink encoding by using the randomly selected codebook and pilot.

303: After the terminal device that performs uplink encoding completes encoding, the terminal device performs uplink transmission.

304: The network device performs blind detection on the grant-free resource group in each subframe by using the at least one codebook and the pilot corresponding to each of the at least one codebook, where the network device may perform the blind detection by using each codebook and by detecting, in a polling manner, the pilot corresponding to each codebook; determines a first pilot set according to a blind detection result, where correct terminal data cannot be obtained by performing blind detection by using a pilot in the first pilot set and a corresponding codebook; and determines a second pilot set in the first pilot set, where a pilot in the second pilot set is a pilot that is in the first pilot set and that has already been sent by the terminal device. Specifically, the network device may determine, according to a signal strength of each pilot in the first pilot set, the pilot that has already been sent by the terminal device. The network device may also record a quantity of times of using a same codebook by at least two terminal devices in each subframe.

305: The network device determines a quantity M of times of selecting, by different terminal devices, a same (codebook pilot) combination in a same subframe within a period of time T (which is a period of time corresponding to N subframes), that is, a total quantity of pilots in the second pilot set corresponding to all codebooks in the N subframes.

306: If M is greater than or equal to a threshold, the network device changes a to-be-used transmission mode of the terminal device, where a spectrum multiplex rate corresponding to the changed to-be-used transmission mode is greater than a spectrum multiplex rate corresponding to a current transmission mode, and sends a notification message to the terminal device, to instruct the terminal device to use the changed to-be-used transmission mode in subsequent transmission. Optionally, if the network device records a quantity of times of using a same codebook by at least different terminal devices in each subframe, the to-be-used transmission mode may be determined with reference to M and a total quantity W of times of using a same codebook by at least different terminal devices in the N subframes. For example, if M is greater than or equal to a threshold and W is greater than or equal to a threshold, the spectrum multiplex rate is to be increased.

Figure 6:
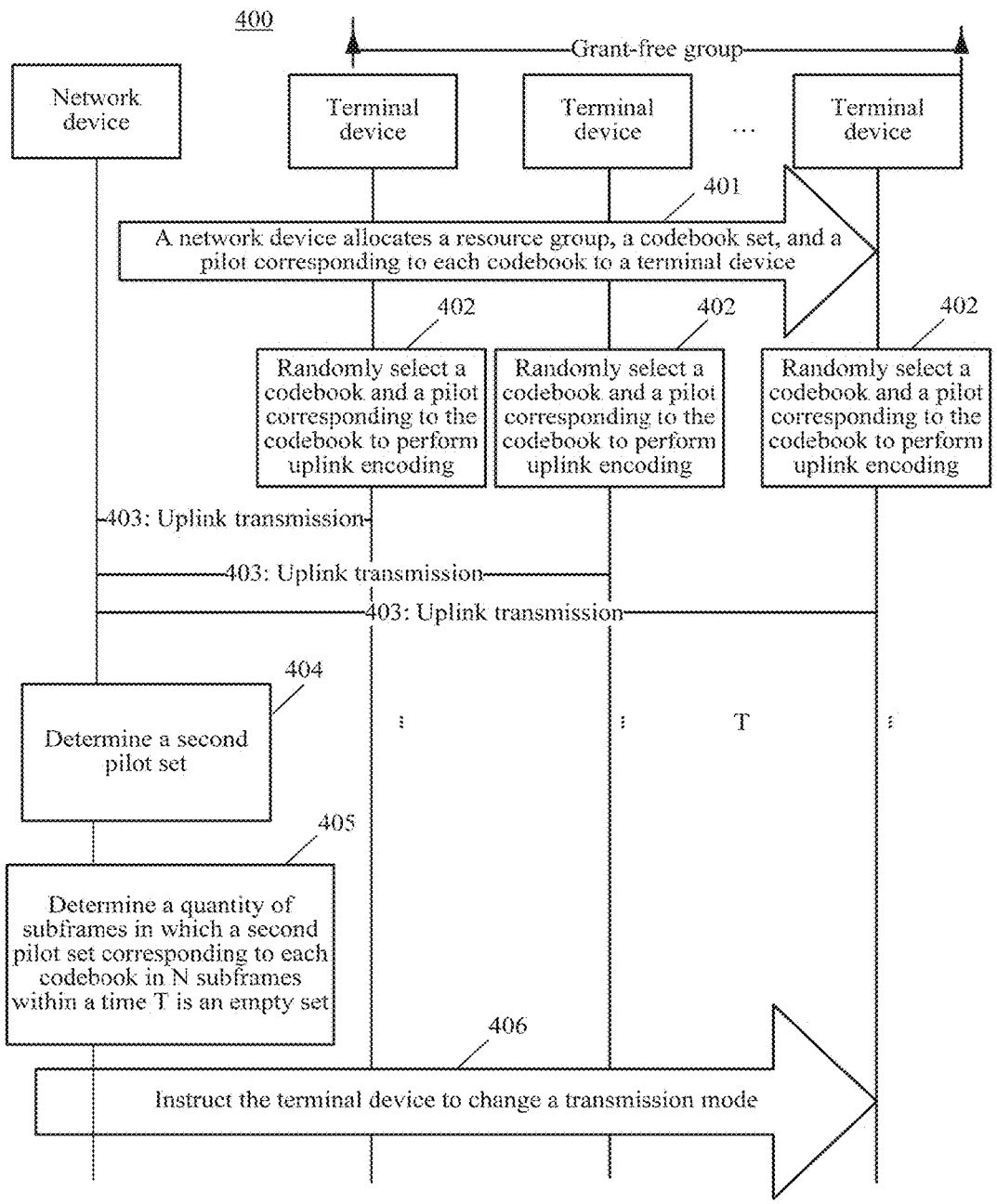
FIG. 6 is a schematic flowchart of a method 400 for scheduling a terminal device according to an embodiment of the present disclosure.

FIG. 6 is a schematic flowchart of a method 400 for scheduling a terminal device according to an embodiment of the present disclosure. As shown in FIG. 6, the method 400 includes the following steps:

401: A network device allocates a grant-free resource group, at least one codebook, and a pilot corresponding to each of the at least one codebook to a grant-free area, where the at least one codebook and the pilot corresponding to each of the at least one codebook are used to perform uplink transmission on the grant-free resource group, and sends the grant-free resource group, the at least one codebook, and the pilot corresponding to each of the at least one codebook to multiple UEs by using a broadcast channel or a control channel. A product of a quantity of codebooks that can be selected by a terminal device and a quantity of pilots corresponding to all codebooks may be less than a maximum quantity of terminal devices that perform access in each subframe.

402: After a terminal device in the grant-free area receives a notification message that is sent by the network device by using the broadcast channel or the control channel, if the terminal device needs to perform uplink transmission in a subframe, the terminal device may randomly select a codebook from the at least one codebook, randomly select a pilot from pilots corresponding to the randomly-selected codebook, and perform uplink encoding by using the randomly selected codebook and pilot.

403: After the terminal device that performs uplink encoding completes encoding, the terminal device performs uplink transmission.

404: The network device performs blind detection on the grant-free resource group in each subframe by using the at least one codebook and the pilot corresponding to each of the at least one codebook, where the network device may perform the blind detection by using each codebook and by detecting, in a polling manner, the pilot corresponding to each codebook; determines a first pilot set according to a blind detection result, where correct terminal data cannot be obtained by performing blind detection by using a pilot in the first pilot set and a corresponding codebook; and determines a second pilot set in the first pilot set, where a pilot in the second pilot set is a pilot that is in the first pilot set and that has already been sent by the terminal device. Specifically, the network device may determine, according to a signal strength of each pilot in the first pilot set, the pilot that has already been sent by the terminal device. The network device may also record a quantity of times of using a same codebook by at least terminal devices in each subframe.

405: The network device determines a quantity S of subframes in which no terminal device selects a same (codebook*pilot) combination within a period of time T (which is a period of time corresponding to N subframes), that is, a quantity of subframes in which a second pilot set corresponding to each codebook is an empty set.

406: If S is greater than or equal to a threshold, the network device changes a to-be-used transmission mode of the terminal device, where a spectrum multiplex rate corresponding to the changed to-be-used transmission mode is less than a spectrum multiplex rate corresponding to a current transmission mode, and sends a notification message to the terminal device, to instruct the terminal device to use the changed to-be-used transmission mode in subsequent transmission. Optionally, if the network device records a quantity of times of using a same codebook by at least different terminal devices in each subframe, the to-be-used transmission mode may be determined with reference to S and a total quantity W of times of using a same codebook by at least different terminal devices in the N subframes. For example, if S is greater than or equal to a threshold and W is less than or equal to a threshold, the spectrum multiplex rate is to be decreased.

Therefore, in this embodiment of the present disclosure, a second pilot set corresponding to each codebook in each of N subframes is determined, where the second pilot set is a pilot set that is of pilots selected by at least two terminal devices and that corresponds to each codebook in each subframe, and a to-be-used transmission mode of a terminal device is determined according to the second pilot set, where different transmission modes correspond to different spectrum multiplex rates. In other words, a spectrum multiplex rate may be flexibly selected according to the pilot set that is of the pilots selected by the at least two terminal devices and that corresponds to each codebook in each of the N subframes, so as to resolve a problem of complex decoding of a network device that results from an increase in a spectrum multiplex rate, and a problem of a collision generated because at least two terminal devices select a same codebook and pilot due to a decrease in a spectrum multiplex rate.

Further, if a quantity of codebooks and/or a quantity of pilots are/is the same, a system capacity may be increased by increasing a quantity of terminal devices; or if a quantity of terminal devices is the same, interference on a same time-frequency resource block is reduced by reducing a quantity of codebooks and/or pilots, so that a decoding rate may be improved to some extent. If there are a few terminal devices, better channel environment is provided, thereby improving spectrum utilization.

Figure 7:
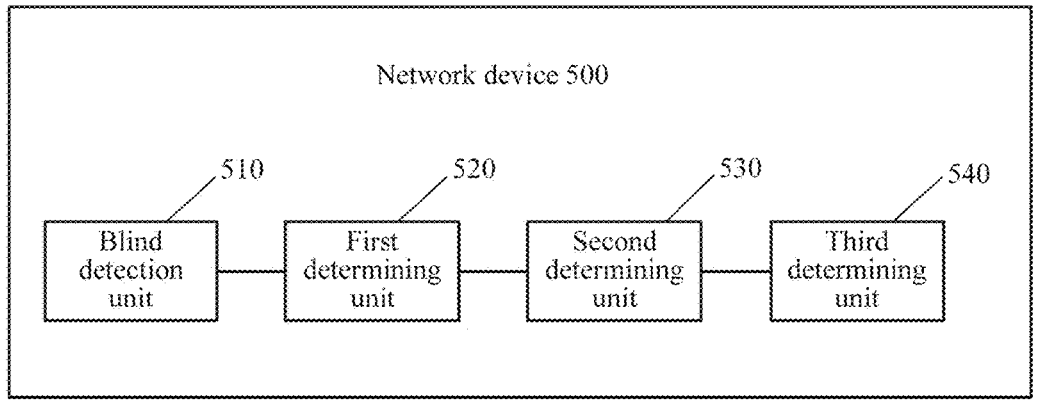
FIG. 7 is a schematic block diagram of a network device 500 according to an embodiment of the present disclosure.

FIG. 7 is a schematic block diagram of a network device 500 according to an embodiment of the present disclosure. As shown in FIG. 7, the network device 500 includes:

a blind detection unit 510, configured to perform blind detection on each of N subframes by using at least one codebook and a pilot corresponding to each of the at least one codebook, where N is a positive integer;

a first determining unit 520, configured to determine, according to a blind detection result that is obtained by the blind detection unit 510, a first pilot set corresponding to each codebook in each subframe, where correct terminal data cannot be obtained by performing blind detection by using a pilot in the first pilot set and a corresponding codebook;

a second determining unit 530, configured to determine, according to the first pilot set that corresponds to each codebook in each subframe and that is determined by the first determining unit 520, a second pilot set corresponding to each codebook in each subframe, where a pilot in the second pilot set is a pilot that is in the first pilot set and that has already been sent by the terminal device; and a third determining unit 540, configured to determine a to-be-used transmission mode of the terminal device according to the second pilot set that corresponds to each codebook in each subframe and that is determined by the second determining unit 530, where different transmission modes correspond to different spectrum multiplex rates.

Specifically, when performing uplink transmission, in each subframe, the terminal device does not request a resource from a network device, but directly performs uplink transmission on a grant-free resource by using a codebook of the at least one codebook and a pilot corresponding to the codebook. In each subframe, the network device performs blind detection on the grant-free resource by using the at least one codebook and the pilot corresponding to each of the at least one codebook. Because each terminal device cannot learn a codebook and a pilot selected by another terminal device, different terminal devices may select a same codebook and a same pilot. In this way, the network device cannot detect data sent by the different terminal devices. Alternatively, if a codebook and a pilot corresponding to the codebook are not selected by the terminal device, the network device cannot obtain terminal data by decoding by using the codebook and the pilot. For the two cases above, the network device cannot obtain correct terminal data. In this case, the network device may determine a first pilot set corresponding to each codebook, where correct terminal data cannot be obtained by performing blind detection by using a pilot in the first pilot set and a corresponding codebook. The network device may determine, in the first pilot set corresponding to each codebook in each subframe, a pilot set, that is, a second pilot set, that corresponds to each codebook in each subframe and that is of pilots already sent by the terminal device. The second pilot set may be understood as a pilot set in which each pilot is selected by at least two terminal devices at the same time. The to-be-used transmission mode of the terminal device is determined according to the second pilot set. Different transmission modes correspond to different spectrum multiplex rates.

Therefore, in this embodiment of the present disclosure, a second pilot set corresponding to each codebook in each of N subframes is determined, where the second pilot set is a pilot set that is of pilots selected by at least two terminal devices and that corresponds to each codebook in each subframe, and a to-be-used transmission mode of a terminal device is determined according to the second pilot set, where different transmission modes correspond to different spectrum multiplex rates. In other words, a spectrum multiplex rate may be flexibly selected according to the pilot set that is of the pilots selected by the at least two terminal devices and that corresponds to each codebook in each of the N subframes, so as to resolve a problem of complex decoding of a network device that results from an increase in a spectrum multiplex rate, and a problem of a collision generated because at least two terminal devices select a same codebook and pilot due to a decrease in a spectrum multiplex rate.

In general cases, it is impossible that the terminal device sends services at all times and arriving frequency of a service packet is far less than transmission frequency of an air-interface frame. Therefore, from a perspective of increasing a quantity of terminal devices that perform access, a same (codebook*pilot) maybe allocated to multiple terminal devices. In this case, a product of a quantity of codebooks that can be selected by the terminal device and a quantity of pilots corresponding to all codebooks is less than the quantity of the terminal devices that perform access.

Optionally, in this embodiment of the present disclosure, if a quantity of codebooks and/or a quantity of pilots are/is the same, a system capacity maybe increased by increasing a quantity of terminal devices; or if a quantity of terminal devices is the same, interference on a same time-frequency resource block is reduced by reducing a quantity of codebooks and/or pilots, so that a decoding rate may be improved to some extent. If there are a few terminal devices, better channel environment is provided, thereby improving spectrum utilization.

In this embodiment of the present disclosure, a spectrum multiplex rate corresponding to a transmission mode of the terminal device may refer to a relationship between a quantity of resource units (Resource Element, RE) and a quantity of terminal devices that multiplex the quantity of REs. The spectrum multiplex rate may be determined by using the quantity of codebooks and/or the quantity of pilots.

Optionally, in this embodiment of the present disclosure, the third determining module 540 is specifically configured to:

determine the to-be-used transmission mode of the terminal device according to at least one of: a total quantity of pilots in second pilot sets corresponding to all codebooks in the N subframes, or a quantity of subframes in which the second pilot set corresponding to each codebook is an empty set.

Figure 8:
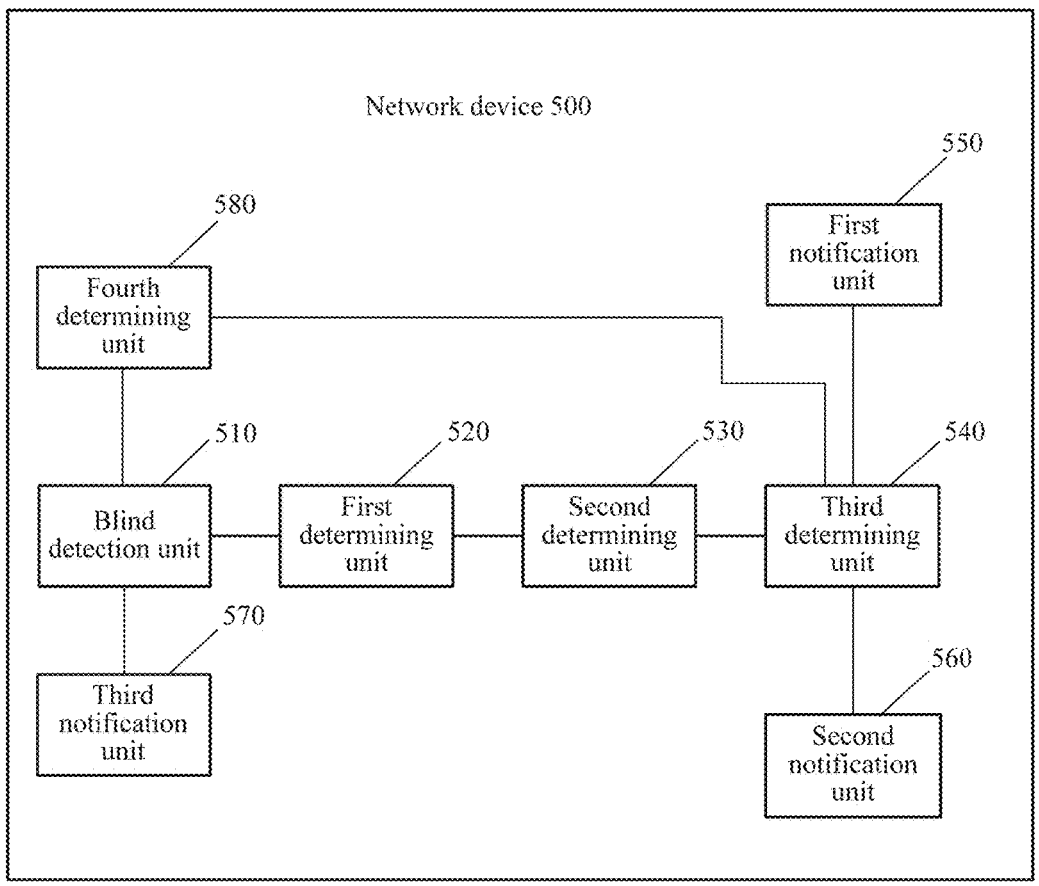
FIG. 8 is another schematic block diagram of a network device 500 according to an embodiment of the present disclosure.

Specifically, when the total quantity of the pilots in the second pilot sets corresponding to all the codebooks in the N subframes is greater than or equal to a first threshold, the third determining unit 540 may determine the to-be-used transmission mode of the terminal device to be a first transmission mode, where a spectrum multiplex rate corresponding to the first transmission mode is greater than a spectrum multiplex rate corresponding to a current transmission mode of the terminal device. In other words, the total quantity of the pilots in the second pilot sets corresponding to all the codebooks in the N subframes may be considered as a total quantity of times different terminal devices select a same (codebook*pilot) combination in the N subframes, that is, a total quantity of times terminal devices collide with each other. If the total quantity is greater than a threshold, it is considered that a current network has excessively high load (which means that terminal devices that perform access cannot perform normal communication because the quantity of codebooks and/or pilots cannot satisfy requirements of the terminal devices, and consequently, the terminal devices collide with each other), and a transmission mode of the terminal device may be changed. For example, a transmission mode in which a spectrum multiplex rate is 150% is changed to a transmission mode in which a spectrum multiplex rate is 300%. Optionally, as shown in FIG. 8, the network device 500 further includes a first notification unit 550, configured to send a first notification message to the terminal device, where the first notification message is used to instruct the terminal device to transmit data in the first transmission mode.

Alternatively, when the quantity of the subframes in which the second pilot set corresponding to each codebook is an empty set is greater than or equal to a second threshold, the third determining unit 540 may determine the to-be-used transmission mode of the terminal device to be a second transmission mode, where a spectrum multiplex rate corresponding to the second transmission mode is less than the spectrum multiplex rate corresponding to the current transmission mode of the terminal device. In other words, the quantity of the subframes in which the second pilot set corresponding to each codebook is an empty set may be considered as a quantity of subframes in which there is no case in which two different terminal devices select a same (codebook*pilot). If the quantity of the subframes is greater than or equal to a threshold, a transmission mode of the terminal device may be changed. For example, a transmission mode in which a spectrum multiplex rate is 300% is changed to a transmission mode in which a spectrum multiplex rate is 150%. Optionally, as shown in FIG. 8, the network device 500 further includes a second notification unit 560, configured to send a second notification message to the terminal device, where the second notification message is used to instruct the terminal device to transmit data in the second transmission mode.

It should be noted that how to determine the to-be-used transmission mode of the terminal device is not limited to the foregoing descriptions. For example, when the total quantity of the pilots in the second pilot sets corresponding to all the codebooks in the N subframes is less than or equal to a threshold, and the quantity of the subframes in which the second pilot set corresponding to each codebook is an empty set is greater than or equal to a threshold, the to-be-used transmission mode of the terminal device is downgraded. Alternatively, when the total quantity of the pilots in the second pilot sets corresponding to all the codebooks in the N subframes is greater than or equal to a threshold, and the quantity of the subframes in which the second pilot set corresponding to each codebook is an empty set is less than or equal to a threshold, the to-be-used transmission mode of the terminal device is upgraded.

Optionally, in this embodiment of the present disclosure, the second determining module 530 is specifically configured to:

determine a signal strength of each pilot in the first pilot set corresponding to each codebook in each subframe; and determine the second pilot set corresponding to each codebook in each subframe according to the signal strength of each pilot in the first pilot set corresponding to each codebook in each subframe, where a signal strength of each pilot in the second pilot set is greater than or equal to a third threshold.

Specifically, if the network device cannot obtain correct terminal data by using a codebook and a pilot corresponding to the codebook, there may be no terminal that performs uplink transmission by using the codebook and the pilot, or there may be different terminal devices that all use the codebook and the pilot. This may be determined by detecting a signal strength of the pilot. If the signal strength of the pilot is greater than a threshold, it may be considered that different terminal devices use the pilot, and consequently, correct decoding cannot be performed. The threshold may be simply set to 0.

Optionally, in this embodiment of the present disclosure, as shown in FIG. 8, the network device 500 further includes a third notification unit 570, configured to: before the blind detection unit performs the blind detection on each of the N subframes, send a third notification message to the terminal device, where the third notification message is used to indicate a transmission mode used by the terminal device in the N subframes, where the transmission mode used in the N subframes is used to indicate the at least one codebook and the pilot corresponding to each of the at least one codebook.

Optionally, as shown in FIG. 8, the network device 500 may further include:

a fourth determining unit 580, configured to determine, according to the blind detection result, a quantity of times of using a same codebook by multiple terminal devices in the N subframes, where the third determining unit 540 is specifically configured to:

determine the to-be-used transmission mode of the terminal device according to the quantity of times of using a same codebook by multiple terminal devices in the N subframes, and the second pilot set corresponding to each codebook in each subframe.

Optionally, a spectrum multiplex rate corresponding to a transmission mode of the terminal device includes 150% and 300%.

Optionally, the network device 500 is a base station.

It should be understood that the network device 500 in this embodiment of the present disclosure may correspond to the network device in the method 200 to the method 400, and can implement corresponding functions of the network device in the method 200 to the method 400. For brevity, details are not described herein again.

Therefore, in this embodiment of the present disclosure, a second pilot set corresponding to each codebook in each of N subframes is determined, where the second pilot set is a pilot set that is of pilots selected by at least two terminal devices and that corresponds to each codebook in each subframe, and a to-be-used transmission mode of a terminal device is determined according to the second pilot set, where different transmission modes correspond to different spectrum multiplex rates. In other words, a spectrum multiplex rate may be flexibly selected according to the pilot set that is of the pilots selected by the at least two terminal devices and that corresponds to each codebook in each of the N subframes, so as to resolve a problem of complex decoding of a network device that results from an increase in a spectrum multiplex rate, and a problem of a collision generated because at least two terminal devices select a same codebook and pilot due to a decrease in a spectrum multiplex rate.

Further, if a quantity of codebooks and/or a quantity of pilots are/is the same, a system capacity may be increased by increasing a quantity of terminal devices; or if a quantity of terminal devices is the same, interference on a same time-frequency resource block is reduced by reducing a quantity of codebooks and/or pilots, so that a decoding rate may be improved to some extent. If there are a few terminal devices, better channel environment is provided, thereby improving spectrum utilization.

Figure 9:
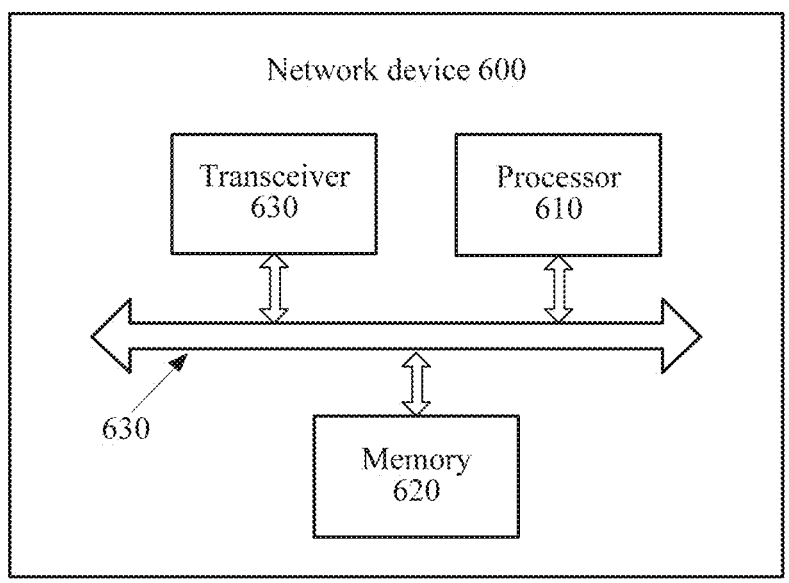
FIG. 9 is a schematic block diagram of a network device 600 according to an embodiment of the present disclosure.

FIG. 9 is a schematic block diagram of a network device 600 according to an embodiment of the present disclosure. As shown in FIG. 9, a network device 600 includes: a processor 610, a memory 620, a bus system 640, and a transceiver 630. The processor 610, the memory 620, and the transceiver 630 are connected by using the bus system 640. The memory 620 is configured to store an instruction. The transceiver is configured to receive data sent by a terminal device. The processor 610 invokes the instruction in the memory to perform the following operations:

performing blind detection on each of N subframes according to at least one codebook and a pilot corresponding to each of the at least one codebook and by using the data received by the transceiver 630, where N is a positive integer;

determining, according to a blind detection result, a first pilot set corresponding to each codebook in each subframe, where correct terminal data cannot be obtained by performing blind detection by using a pilot in the first pilot set and a corresponding codebook;

determining, according to the first pilot set corresponding to each codebook in each subframe, a second pilot set corresponding to each codebook in each subframe, where a pilot in the second pilot set is a pilot that is in the first pilot set and that has already been sent by the terminal device; and determining a to-be-used transmission mode of the terminal device according to the second pilot set corresponding to each codebook in each subframe, where different transmission modes correspond to different spectrum multiplex rates.

Specifically, when performing uplink transmission, the terminal device does not request a resource from a network device in each subframe, but directly performs uplink transmission on a grant-free resource by using a codebook of the at least one codebook and a pilot corresponding to the codebook. In each subframe, the network device performs blind detection on the grant-free resource by using the at least one codebook and the pilot corresponding to each of the at least one codebook. Because each terminal device cannot learn a codebook and a pilot selected by another terminal device, different terminal devices may select a same codebook and a same pilot. In this way, the network device cannot detect data sent by the different terminal devices. Alternatively, if a codebook and a pilot corresponding to the codebook are not selected by the terminal device, the network device cannot obtain terminal data by decoding by using the codebook and the pilot. For the two cases above, the network device cannot obtain correct terminal data. In this case, the network device may determine a first pilot set corresponding to each codebook, where correct terminal data cannot be obtained by performing blind detection by using a pilot in the first pilot set and a corresponding codebook. The network device may determine, in the first pilot set corresponding to each codebook in each subframe, a pilot set, that is, a second pilot set, that corresponds to each codebook in each subframe and that is of pilots already sent by the terminal device. The second pilot set may be understood as a pilot set in which each pilot is selected by at least two terminal devices at the same time. The to-be-used transmission mode of the terminal device is determined according to the second pilot set. Different transmission modes correspond to different spectrum multiplex rates.

Therefore, in this embodiment of the present disclosure, a second pilot set corresponding to each codebook in each of N subframes is determined, where the second pilot set is a pilot set that is of pilots selected by at least two terminal devices and that corresponds to each codebook in each subframe, and a to-be-used transmission mode of a terminal device is determined according to the second pilot set, where different transmission modes correspond to different spectrum multiplex rates. In other words, a spectrum multiplex rate may be flexibly selected according to the pilot set that is of the pilots selected by the at least two terminal devices and that corresponds to each codebook in each of the N subframes, so as to resolve a problem of complex decoding of a network device that results from an increase in a spectrum multiplex rate, and a problem of a collision generated because at least two terminal devices select a same codebook and pilot due to a decrease in a spectrum multiplex rate.

In general cases, it is impossible that the terminal device sends services at all times and arriving frequency of a service packet is far less than transmission frequency of an air-interface frame. Therefore, from a perspective of increasing a quantity of terminal devices that perform access, a same (codebook*pilot) may be allocated to multiple terminal devices. In this case, a product of a quantity of codebooks that can be selected by the terminal device and a quantity of pilots corresponding to all codebooks is less than the quantity of the terminal devices that perform access.

Optionally, in this embodiment of the present disclosure, if a quantity of codebooks and/or a quantity of pilots are/is the same, a system capacity maybe increased by increasing a quantity of terminal devices; or if a quantity of terminal devices is the same, interference on a same time-frequency resource block is reduced by reducing a quantity of codebooks and/or pilots, so that a decoding rate may be improved to some extent. If there are a few terminal devices, better channel environment is provided, thereby improving spectrum utilization.

Optionally, in this embodiment of the present disclosure, in the process in which the processor 610 invokes the instruction in the memory 620 to determine the to-be-used transmission mode of the terminal device according to the second pilot set corresponding to each codebook in each subframe, the processor 610 specifically performs the following operation:

determining the to-be-used transmission mode of the terminal device according to at least one of: a total quantity of pilots in second pilot sets corresponding to all codebooks in the N subframes, or a quantity of subframes in which the second pilot set corresponding to each codebook is an empty set.

Optionally, in this embodiment of the present disclosure, in the process in which the processor 610 invokes the instruction in the memory 620 to determine the to-be-used transmission mode of the terminal device, the processor 610 specifically performs the following operation:

when the total quantity of the pilots in the second pilot sets corresponding to all the codebooks in the N subframes is greater than or equal to a first threshold, determining the to-be-used transmission mode of the terminal device to be a first transmission mode, where a spectrum multiplex rate corresponding to the first transmission mode is greater than a spectrum multiplex rate corresponding to a current transmission mode of the terminal device; and the processor 610 invokes the instruction in the memory 620 to further perform the following operation:

sending a first notification message to the terminal device by using the transceiver 630, where the first notification message is used to instruct the terminal device to transmit data in the first transmission mode.

Optionally, in this embodiment of the present disclosure, in the process in which the processor 610 invokes the instruction in the memory 620 to determine the to-be-used transmission mode of the terminal device, the processor 610 specifically performs the following operation:

when the quantity of the subframes in which the second pilot set corresponding to each codebook is an empty set is greater than or equal to a second threshold, determining the to-be-used transmission mode of the terminal device to be a second transmission mode, where a spectrum multiplex rate corresponding to the second transmission mode is less than the spectrum multiplex rate corresponding to the current transmission mode of the terminal device; and the processor 610 invokes the instruction in the memory 620 to further perform the following operation:

sending a second notification message to the terminal device by using the transceiver 630, where the second notification message is used to instruct the terminal device to transmit data in the second transmission mode.

Optionally, in this embodiment of the present disclosure, in the process in which the processor 610 invokes the instruction in the memory 620 to determine the second pilot set corresponding to each codebook in each subframe, the processor 610 specifically performs the following operations:

determining a signal strength of each pilot in the first pilot set corresponding to each codebook in each subframe; and determining the second pilot set corresponding to each codebook in each subframe according to the signal strength of each pilot in the first pilot set corresponding to each codebook in each subframe, where a signal strength of each pilot in the second pilot set is greater than or equal to a third threshold.

Optionally, in this embodiment of the present disclosure, before performing blind detection on each of N subframes, the processor 610 invokes the instruction in the memory 620 to further perform the following operation:

sending a third notification message to the terminal device, where the third notification message is used to indicate a transmission mode used by the terminal device in the N subframes, where the transmission mode used in the N subframes is used to indicate the at least one codebook and the pilot corresponding to each of the at least one codebook.

Optionally, in this embodiment of the present disclosure, the processor 610 invokes the instruction in the memory 620 to further perform the following operation:

determining, according to the blind detection result, a quantity of times of using a same codebook by multiple terminal devices in the N subframes; and in the process in which the processor 610 invokes the instruction in the memory 620 to determine the to-be-used transmission mode of the terminal device according to the second pilot set corresponding to each codebook in each subframe, the processor 610 specifically performs the following operation:

determining the to-be-used transmission mode of the terminal device according to the quantity of times of using a same codebook by multiple terminal devices in the N subframes, and the second pilot set corresponding to each codebook in each subframe.

Optionally, in this embodiment of the present disclosure, a spectrum multiplex rate corresponding to a transmission mode of the terminal device includes 150% and 300%.

Optionally, in this embodiment of the present disclosure, the network device 600 is a base station.

It should be understood that the network device 600 in this embodiment of the present disclosure may correspond to the network device in the method 200 to the method 400, and can implement corresponding functions of the network device in the method 200 to the method 400. For brevity, details are not described herein again.

Therefore, in this embodiment of the present disclosure, a second pilot set corresponding to each codebook in each of N subframes is determined, where the second pilot set is a pilot set that is of pilots selected by at least two terminal devices and that corresponds to each codebook in each subframe, and a to-be-used transmission mode of a terminal device is determined according to the second pilot set, where different transmission modes correspond to different spectrum multiplex rates. In other words, a spectrum multiplex rate may be flexibly selected according to the pilot set that is of the pilots selected by the at least two terminal devices and that corresponds to each codebook in each of the N subframes, so as to resolve a problem of complex decoding of a network device that results from an increase in a spectrum multiplex rate, and a problem of a collision generated because at least two terminal devices select a same codebook and pilot due to a decrease in a spectrum multiplex rate.

Further, if a quantity of codebooks and/or a quantity of pilots are/is the same, a system capacity may be increased by increasing a quantity of terminal devices; or if a quantity of terminal devices is the same, interference on a same time-frequency resource block is reduced by reducing a quantity of codebooks and/or pilots, so that a decoding rate may be improved to some extent. If there are a few terminal devices, better channel environment is provided, thereby improving spectrum utilization.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components maybe combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units maybe selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for scheduling a terminal device, the method comprising:
performing blind detection on each of N subframes by using at least one codebook and a pilot corresponding to each of the at least one codebook, wherein N is a positive integer;
determining, according to a blind detection result, a first pilot set corresponding to each codebook in each subframe, wherein correct terminal data cannot be obtained by performing blind detection by using a pilot in the first pilot set and a corresponding codebook;
determining, according to the first pilot set corresponding to each codebook in each subframe, a second pilot set corresponding to each codebook in each subframe, wherein a pilot in the second pilot set is a pilot that is in the first pilot set and that has already been sent by the terminal device; and
determining a to-be-used transmission mode of the terminal device according to the second pilot set corresponding to each codebook in each subframe, wherein different transmission modes correspond to different spectrum multiplex rates.

2. The method according to claim 1, wherein a product of a quantity of codebooks in the at least one codebook and a quantity of pilots corresponding to the codebooks is less than a quantity of terminal devices that perform access in each subframe.

3. The method according to claim 1, wherein determining the to-be-used transmission mode of the terminal device according to the second pilot set corresponding to each codebook in each subframe comprises:
determining the to-be-used transmission mode of the terminal device according to at least one of:
a total quantity of pilots in second pilot sets corresponding to all codebooks in the N subframes, or
a quantity of subframes in which the second pilot set corresponding to each codebook is an empty set.

4. The method according to claim 3, wherein when the total quantity of the pilots in the second pilot sets corresponding to all the codebooks in the N subframes is greater than or equal to a first threshold:
determining the to-be-used transmission mode of the terminal device to be a first transmission mode, wherein a spectrum multiplex rate corresponding to the first transmission mode is greater than a spectrum multiplex rate corresponding to a current transmission mode of the terminal device; and
sending a first notification message to the terminal device, wherein the first notification message is used to instruct the terminal device to transmit data in the first transmission mode.

5. The method according to claim 3, wherein when the quantity of the subframes in which the second pilot set corresponding to each codebook is an empty set is greater than or equal to a second threshold:
determining the to-be-used transmission mode of the terminal device to be a second transmission mode, wherein a spectrum multiplex rate corresponding to the second transmission mode is less than the spectrum multiplex rate corresponding to the current transmission mode of the terminal device; and
sending a second notification message to the terminal device, wherein the second notification message is used to instruct the terminal device to transmit data in the second transmission mode.

6. The method according to claim 1, wherein determining the second pilot set corresponding to each codebook in each subframe comprises:
determining a signal strength of each pilot in the first pilot set corresponding to each codebook in each subframe; and
determining the second pilot set corresponding to each codebook in each subframe according to the signal strength of each pilot in the first pilot set corresponding to each codebook in each subframe, wherein a signal strength of each pilot in the second pilot set is greater than or equal to a third threshold.

7. The method according to claim 1, wherein before performing the blind detection on each of N subframes, the method further comprises:
sending a third notification message to the terminal device, wherein the third notification message is used to indicate a transmission mode used by the terminal device in the N subframes, wherein the transmission mode used in the N subframes is used to indicate the at least one codebook and the pilot corresponding to each of the at least one codebook.

8. The method according to claim 1, further comprising:
determining, according to the blind detection result, a quantity of times of using a same codebook by multiple terminal devices in the N subframes; and
determining the to-be-used transmission mode of the terminal device according to the second pilot set corresponding to each codebook in each subframe comprises:
determining the to-be-used transmission mode of the terminal device according to the quantity of times of using a same codebook by multiple terminal devices in the N subframes, and the second pilot set corresponding to each codebook in each subframe.

9. The method according to claim 1, wherein a spectrum multiplex rate corresponding to a transmission mode of the terminal device comprises 150% and 300%.

10. A network device, comprising: a processor, a memory, a bus system, and a transceiver, wherein the processor, the memory, and the transceiver are connected by using the bus system, the transceiver is configured to receive data sent by a terminal device, and the memory is configured to store instructions that, when executed by the processor, cause the network device to:
perform blind detection on each of N subframes according to at least one codebook and a pilot corresponding to each of the at least one codebook and by using the data received by the transceiver, wherein N is a positive integer;
determine, according to a blind detection result, a first pilot set corresponding to each codebook in each subframe, wherein correct terminal data cannot be obtained by performing blind detection by using a pilot in the first pilot set and a corresponding codebook;
determine, according to the first pilot set corresponding to each codebook in each subframe, a second pilot set corresponding to each codebook in each subframe, wherein a pilot in the second pilot set is a pilot that is in the first pilot set and that has already been sent by the terminal device; and determine a to-be-used transmission mode of the terminal device according to the second pilot set corresponding to each codebook in each subframe, wherein different transmission modes correspond to different spectrum multiplex rates.

11. The network device according to claim 10, wherein a product of a quantity of codebooks in the at least one codebook and a quantity of pilots corresponding to the codebooks is less than a quantity of terminal devices that perform access in each subframe.

12. The network device according to claim 10, wherein the memory is further configured to store instructions that, when executed by the processor, cause the network device to:
determine the to-be-used transmission mode of the terminal device according to at least one of:
a total quantity of pilots in second pilot sets corresponding to all codebooks in the N subframes, or
a quantity of subframes in which the second pilot set corresponding to each codebook is an empty set.

13. The network device according to claim 12, wherein the memory is further configured to store instructions that, when executed by the processor, cause the network device to:
when the total quantity of the pilots in the second pilot sets corresponding to all the codebooks in the N subframes is greater than or equal to a first threshold:
determine the to-be-used transmission mode of the terminal device to be a first transmission mode, wherein a spectrum multiplex rate corresponding to the first transmission mode is greater than a spectrum multiplex rate corresponding to a current transmission mode of the terminal device; and
send a first notification message to the terminal device by using the transceiver, wherein the first notification message is used to instruct the terminal device to transmit data in the first transmission mode.

14. The network device according to claim 12, wherein the memory is further configured to store instructions that, when executed by the processor, cause the network device to:
when the quantity of the subframes in which the second pilot set corresponding to each codebook is an empty set is greater than or equal to a second threshold:
determine the to-be-used transmission mode of the terminal device to be a second transmission mode, wherein a spectrum multiplex rate corresponding to the second transmission mode is less than the spectrum multiplex rate corresponding to the current transmission mode of the terminal device; and
send a second notification message to the terminal device by using the transceiver, wherein the second notification message is used to instruct the terminal device to transmit data in the second transmission mode.

15. The network device according to claim 10, wherein the memory is further configured to store instructions that, when executed by the processor, cause the network device to:
determine a signal strength of each pilot in the first pilot set corresponding to each codebook in each subframe; and
determine the second pilot set corresponding to each codebook in each subframe according to the signal strength of each pilot in the first pilot set corresponding to each codebook in each subframe, wherein a signal strength of each pilot in the second pilot set is greater than or equal to a third threshold.

16. The network device according to claim 10, wherein the memory is further configured to store instructions that, when executed by the processor, cause the network device to:
before performing blind detection on each of N subframes:
send a third notification message to the terminal device, wherein the third notification message is used to indicate a transmission mode used by the terminal device in the N subframes, wherein the transmission mode used in the N subframes is used to indicate the at least one codebook and the pilot corresponding to each of the at least one codebook.

17. The network device according to claim 10, wherein the memory is further configured to store instructions that, when executed by the processor, cause the network device to:
determine, according to the blind detection result, a quantity of times of using a same codebook by multiple terminal devices in the N subframes; and
determine the to-be-used transmission mode of the terminal device according to the quantity of times of using a same codebook by multiple terminal devices in the N subframes, and the second pilot set corresponding to each codebook in each subframe.

18. The network device according to claim 10, wherein a spectrum multiplex rate corresponding to a transmission mode of the terminal device comprises 150% and 300%.

19. The network device according to claim 10, wherein the network device is a base station.

* * * * *